Patented Dec. 23, 1947

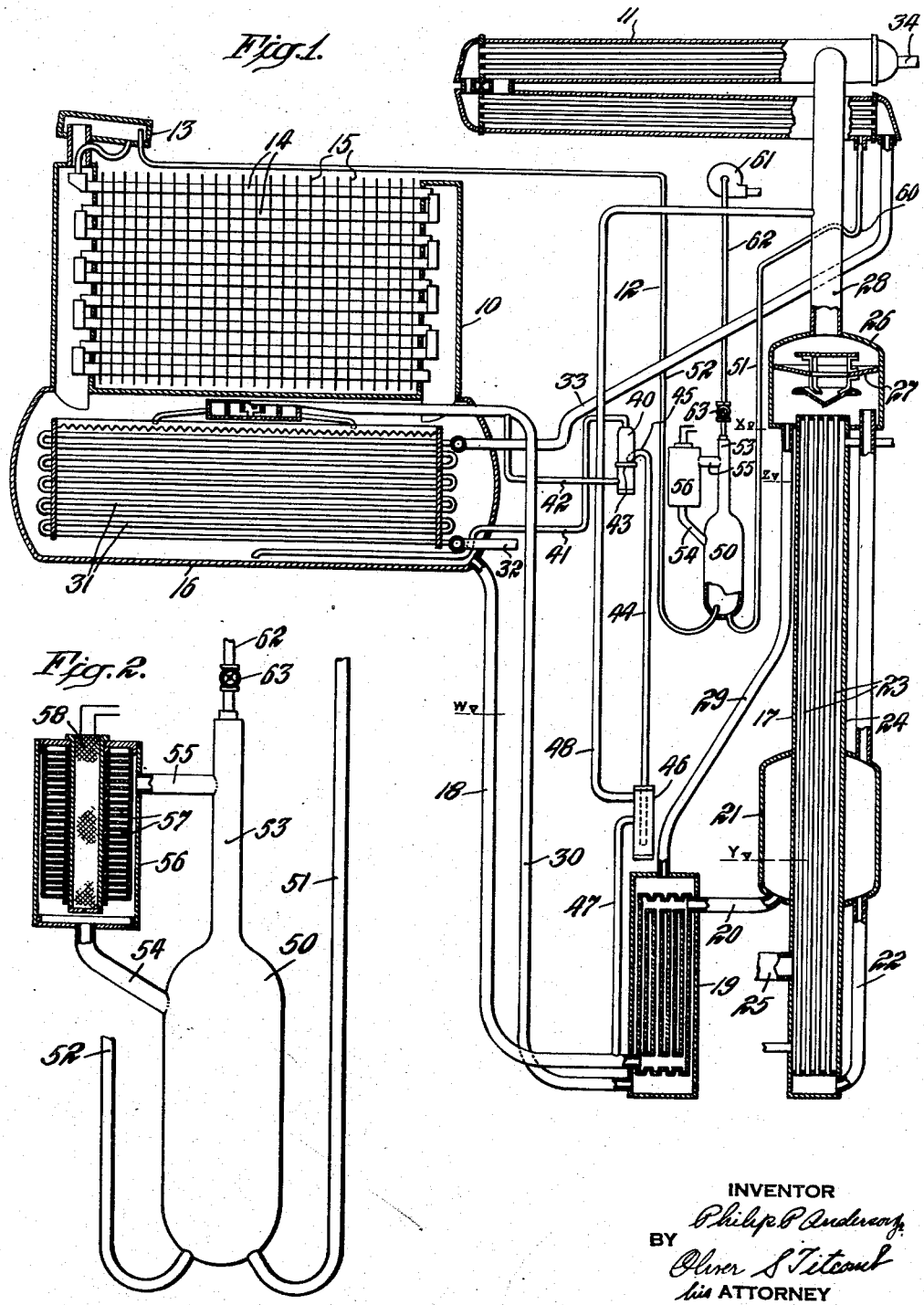

2,432,978

UNITED STATES PATENT OFFICE 2,432,978

GAS PURGER AND SOLUTION REGULATOR IN VACUUM TYPE ABSORPTION REFRIGERATING APPARATUS

Philip P. Anderson, Jr., Evansville, Ind., assignor to Servel, Inc., New York, N. Y., a corporation of Delaware Application June 10, 1944, Serial No. 539,610

15 Claims. (Cl. 62—119)

1

The present invention relates to absorption refrigeration systems and more particularly to a method of and apparatus for regulating the concentration of the absorption solution.

While the method and apparatus of the present invention may be used in other absorption refrigeration systems it is particularly adapted for use in a system of the type illustrated and described in the United States Letters Patent to Albert R. Thomas et al., No. 2,282,503, entitled Refrigeration. The absorption refrigeration system illustrated in the Thomas et al. patent operates in a partial vacuum and utilizes water as a refrigerant and a saline solution as an absorbent. If the concenteration of the saline solution in such a system is allowed to increase beyond its saturation point at the particular operating temperature salt will crystallize out of the solution which may cause plugging of the conduits and interferes generally with the proper operation of the system.

Preferably, the elements of the Thomas et al. apparatus are so constructed and arranged as to promote continuous circulation of refrigerant therethrough whereby to prevent the trapping and/or accumulation of liquid refrigerant which would tend to increase the concentration of the absorption solution. As a result of the preferred construction illustrated in the Thomas et al. patent a salt solution of relatively strong concentration may be used. However, even with a solution of a concentration to give the desired capacity, the presence of non-condensible gases in the absorber may cause crystallization of salt from the solution. The presence of non-condensible gases in the absorber decreases the rate of evaporation in the evaporator so that a greater amount of liquid refrigerant is retained in transit in the evaporator as it flows therethrough which increases the concentration of salt in the solution circuit. When the salt concentration increases beyond the saturation point at the place of lowest temperature in the solution circuit, it will crystallize and precipitate out of solution.

One of the objects of the present invention is to regulate the concentration of the absorption solution in a refrigeration system of the type indicated to prevent crystallization of salt from solution upon the occurrence of non-condensible gases in the system.

2

Another object is to provide a method of and apparatus for producing a strong concentration of the saline absorption solution and diluting the solution upon the occurrence of a condition in the system tending to cause crystallization of salt from the solution.

Another object of the invention is to provide a storage vessel connected to receive and store liquid refrigerant to increase the concentration of the absorbent and connected to receive non-condensible gases occurring in the system which displace the liquid refrigerant to dilute the absorption solution.

Another object is to provide an apparatus for continuously transferring non-condensible gases from the various elements of the system to the storage vessel.

Still another object of the invention is to provide a heated chemical in the storage vessel which is adapted to absorb or react with the non-condensible gases and to cause a circulation of the gases therethrough.

These and other objects will become more apparent from the following description and drawings in which like reference characters denote like parts throughout the several views. It is to be understood, however, that the drawings are for the purpose of illustration only and not a definition of the limits of the invention, reference being had for this purpose to the appended claims.

In the drawings:

Fig. 1 is a diagrammatic view of an absorption refrigeration system incorporating the novel features of the present invention, and Fig. 2 is an enlarged view of the storage vessel showing the circulating chamber connected thereto having heated copper oxide plates therein.

In accordance with the method of the present invention the absorption refrigeration system is initially charged with a saline solution sufficiently dilute so as to prevent crystallization upon the occurrence of any condition which may be expected to occur in the system. During operation of the system a predetermined amount of liquid refrigerant is diverted from its path of flow through the system and stored in a storage vessel connected to the system. Such diversion and storage of liquid refrigerant increases the concentration of the absorption solution circulating in the system and thereby produces the desired refrigerating capacity of the system. The system will continue to operate at this capacity until a change in operating conditions occurs such as the presence of non-condensible gases in the absorber. When such gases occur in the system they are transferred automatically to the storage vessel to displace an equal volume of the liquid refrigerant therein and cause it to circulate through the system. The circulation of additional refrigerant in the system will dilute the absorption solution and thereby avoid the crystallization of salt therefrom.

Preferably, the non-condensible gases will be circulated in the storage vessel in contact with a heated chemical which either absorbs or reacts with the gases to remove them from the system. As the non-condensible gases are absorbed in the heated chemical or otherwise removed from the storage vessel more liquid refrigerant will be diverted from the system and stored in the storage vessel to again concentrate the solution and increase the capacity of the system. The method of the present invention, therefore, provides for automatically increasing or decreasing the concentration of the absorption solution in the system in accordance with conditions such as the presence or absence of non-condensible gases.

Referring to the drawings, an apparatus for carrying out the steps of the method is shown applied to a two-pressure absorption refrigeration system similar to that illustrated and described in the Thomas et al. patent, referred to above. In a system of this type liquid refrigerant such as, for example, water is introduced into the upper part of an evaporator or cooling element 10 from a condenser 11 through a path of flow including a U-tube 12 and flash chamber 13. As illustrated in Fig. 1 of the drawings the U-tube 12 comprises separate conduits connected to the bottom of a storage vessel 50, later to be described in detail. The liquid refrigerant evaporates in the evaporator 10 with consequent absorption of heat from the ambient, such as a stream of air flowing over the exterior surface of the tubes 14 and fins 15 of the evaporator. The refrigerant vapor formed in the evaporator 10 flows to an absorber 16 where the vapor is absorbed into a liquid absorbent such as, for example, a solution of lithium chloride, lithium bromide or the like.

The absorption liquid enriched with refrigerant is conducted from the absorber 16 to a generator 17 in a path of flow including conduit 18, liquid heat exchanger 19, conduit 20, vessel 21, and conduit 22. Within the generator 17 a plurality of riser tubes 23 are enclosed within a shell 24 forming a chamber to which stream is supplied through a conduit 25 from a suitable source of supply. The heating of the riser tubes 23 by the steam causes refrigerant vapor to be expelled from the absorption solution and the expelled vapor is effective to raise the absorption liquid by gas or vapor-lift action.

The expelled vapor passes from the upper ends of the riser tubes 23 into a vapor separating chamber 26 having suitable baffles 27 therein and thence flows through a conduit 28 to the condenser 11 where the vapor is liquefied. The liquid refrigerant formed in the condenser 11 flows by gravity into the U-tube 12 to the upper part of the evaporator 10 as explained above to complete the refrigeration cycle.

The raised absorption liquid from which refrigerant vapor has been expelled is conducted from the upper part of the generator 17 to the absorber 16 to absorb refrigerant vapor, this liquid being conducted to the absorber in a path of flow including a conduit 29, liquid heat exchanger 19, and conduit 30. The heat liberated by the absorption of refrigerant vapor in the absorber 16 is taken up by a cooling medium such as, for example, water which flows upwardly through vertically disposed banks of pipes 31 in the absorber. The cooling water is introduced into the lower end of the banks of pipes through a conduit 32 and is discharged from the upper ends of the banks of pipes through a conduit 33. The conduit 33 is connected to the condenser 11 so that the cooling water also may be utilized to effect cooling of the condenser. The cooling water is discharged from the condenser 11 through a conduit 34.

The system operates in a partial vacuum with generator 17 and condenser 11 operating at one pressure and the evaporator 10 and absorber 16 operating at a lower pressure. The pressure differential between the high and low pressure sides of the system is maintained by liquid columns in the up-leg of the U-tube 12 between the condenser 11 and the evaporator 10 and in the conduits 18 and 30 connecting the absorber 16 and heat exchanger 19. The liquid level in the U-tube 12 is indicated by the reference character $x$; the liquid levels in the conduit 18 and vessel 21 connected thereto through the heat exchanger 19 are indicated by the reference characters $w$ and $y$; and the liquid level in the conduit 29 connected to the conduit 30 through the heat exchanger 19 is indicated by the reference character $z$.

During operation of the refrigeration system non-condensible gases may accumulate in the various elements thereof. These non-condensible gases are probably formed by the chemical action of the fluids with the metallic parts of the system. Any non-condensible gases occurring in the generator 17 are swept into the condenser 11 with the refrigerant vapor flowing thereto at high velocity and tend to accumulate therein adjacent its outlet. The non-condensible gases in the evaporator 10 are swept into the absorber 16 with the refrigerant vapor as it flows into the absorber at high velocity. The gases then accumulate in a layer at the bottom and center of the absorber 16 where turbulence is at a minimum. Thus, the non-condensible gases accumulate adjacent the outlet from the condenser 11 and at the bottom and center of the absorber 16 and blanket off that portion of the condenser or absorber which they cover.

In the embodiment of the invention illustrated in Fig. 1 of the drawings the non-condensible gases are transferred continuously from the absorber 16 to the condenser 11 by means of a vessel 40 which draws the gases from the bottom of the absorber into the top thereof through a conduit 41. A portion of the absorption liquid flowing to the upper part of the absorber 16 through the conduit 30 is diverted to the bottom of the vessel 40 through a conduit 42. Preferably an apertured septum plate 43 is positioned intermediate the ends of the vessel 40 to provide a measuring orifice for controlling the amount of absorption liquid flowing therethrough. Thus, the diverted absorption liquid is brought into intimate contact with the non-condensible gases drawn into the top of the vessel 40 through the conduit 41. A vertical tube 44, which may be referred to as a fall tube pump, has a curved upper end 45 connected to the vessel 40 above the septum plate 43 and its lower end extends into a separating chamber 46. A conduit 47 is connected to the separating chamber 46 at a point above the lower end of the vertical tube 44 and the opposite end of the conduit is connected to the conduit 18 leading to the heat exchanger 19. A second conduit 48 is connected to the separating chamber 46 at a point above the conduit 47 and the upper end of the second conduit is connected to the conduit 28 between the generator 17 and condenser 11.

Absorption liquid flows into the bottom of the vessel 40 and upwardly through the orifice in the septum plate 43 and into the upper bent end 45 of the fall tube 44 until the liquid siphons into the fall tube. At the end of a siphoning operation small quantities of non-condensible gases in the upper part of the vessel 40 enter the upper bent end 45 of the fall tube 44 and become trapped between successive bodies or slugs of the absorption liquid. The internal diameter of the fall tube 44 is such that gas and liquid cannot pass each other while flowing therethrough and the column of absorption liquid and non-condensible gases maintains the pressure differential between the high pressure and low pressure sides of the system. The non-condensible gases are discharged from the lower end of the fall tube 44 and bubble upwardly through the absorption liquid in the separating chamber 46 which acts to strip any refrigerant vapor therefrom and the gases escape through the conduits 48 and 28 to the condenser 11. The absorption liquid in the separating chamber 46 escapes through the conduit 47 to the conduit 18 in the main circuit of the refrigeration system. Thus, the non-condensible gases in the low pressure side of the system are transferred continuously to the condenser 11 where they accumulate adjacent the outlet end thereof.

In accordance with the present invention a storage vessel 50 is provided between the down-leg 51 and up-leg 52 of the U-tube 12 connecting the condenser 11 to the evaporator 10. While the storage vessel 50 may have other forms it is illustrated in the drawings in the shape of a cylindrical bottle having a narrow neck 53 at its upper end. The storage vessel 50 is supported by the legs 51 and 52 of the U-tube 12 connected at their lower ends to the bottom thereof and in communication with each other through the interior of the vessel. In communication with the side and neck 53 of the storage vessel 50 through conduits 54 and 55 is chamber 56 which provides a path of flow for circulating non-condensible gases accumulating in the vessel. A plurality of copper oxide plates 57 are arranged in spaced relationship within the chamber 56 and are adapted to be heated to a relatively high temperature by an electric heating unit 58. The heated copper oxide plates 57 serve the dual purpose of reacting chemically with the non-condensible gases to dispose of the gases and providing for the circulation of the gases through the plates by thermosiphon action.

The non-condensible gases in the condenser 11 are transferred automatically to the storage vessel 50 by means of a siphon pump 60 in the down-leg of the U-tube 12. The siphon pump 60 comprises a horizontally extending reversed bend between vertical portions of the down-leg 51 of the U-tube. The siphon pump 60 receives liquid refrigerant from the condenser 11 until the depending loop thereof is filled after which the liquid siphons into the downwardly extending portion of the leg of the U-tube and draws non-condensible gases thereinto from the condenser 11 in a manner similar to the fall tube pump 44. Thus, the siphon pump 60 operates intermittently to deliver liquid refrigerant or alternate slugs of liquid refrigerant and pockets of non-condensible gases, if the gases are present, from the condenser 11 to the storage vessel 50.

As illustrated in Fig. 1 of the drawings the neck portion 53 of the storage vessel 50 is connected to a vacuum pump 61 by means of an exhaust pipe 62 to provide for purging gases from the system. A manually operable shut-off valve 63 is provided in the exhaust pipe 62 to control a purging operation. A preferred embodiment of the invention having now been described in detail, the mode of operation of the apparatus is explained as follows.

The system is initially charged with a saline solution sufficiently dilute so as to prevent crystallization of salt under all conditions which may be expected to occur. To initiate operation of the refrigeration system, steam will be supplied to the generator 17 through the conduit 25 which will vaporize refrigerant vapor in the tubes 23. The vaporized refrigerant will rise through the separating chamber 26 and conduit 28 into the condenser 11 where the vapor will be condensed to a liquid. The liquid refrigerant will flow from the outlet of the condenser 11 through the U-tube 12 and flash chamber 13 into the evaporator 10 where the liquid refrigerant will be evaporated to produce refrigeration. Refrigerant vapors in the evaporator 10 will flow to the absorber 16 where they will be absorbed in absorption solution therein. Dilute absorption solution will flow continuously from the absorber 16 through the conduit 18, heat exchanger 19, conduit 20, chamber 21, and conduit 22 back to the base of the generator 17. Simultaneously concentrated absorption solution in the separating chamber 26 will flow through the conduit 29, heat exchanger 19, and conduit 30, back into the absorber 16.

Also during operation of the refrigeration system the refrigerant liquid flowing from the condenser 11 through the down-leg 51 of the U-tube 12 will enter the bottom of the storage vessel 50 and flow therethrough into the lower end of the up-leg 52 of the U-tube 12 to form a liquid trap. After the liquid trap has been formed in the up-leg 52 of the U-tube 12 the liquid refrigerant will continuously flow into the vessel 50 and accumulate therein until the vessel is filled. After the vessel 50 has been filled all of the liquid refrigerant delivered from the condenser 11 then will flow to the evaporator 10. The vessel 50 thus operates to divert a part of the liquid refrigerant from the active part of the system to increase the concentration of the absorption solution flowing between the absorber 16 and generator 17. Due to its high degree of concentration the absorption solution will absorb refrigerant vapor at a fast rate at low temperature to produce optimum operating conditions whereby the evaporator 10 will absorb heat at maximum capacity.

If non-condensible gases occur during operation of the refrigeration system they are apt to further increase the concentration of the absorption solution and cause a crystallization of salt therefrom. Any non-condensible gases occurring in the generator 17 will be carried into the condenser 11 by the refrigerant vapor and will accumulate adjacent the outlet therefrom. Simultaneously any non-condensible gases occurring in the evaporator 10 will be swept into the absorber 16 by the refrigerant vapor and will accumulate in the bottom and center of the absorber where turbulence is at a minimum. The non-condensible gases at the bottom and center of the absorber 16 will be continuously withdrawn therefrom and transferred to the condenser 11 by means of the vessel 40 and fall tube pump 44. Thus, the non-condensible gases occurring in the various parts of the system will be transferred continuously to the condenser 11 where they accumulate adjacent the outlet therefrom.

The liquid refrigerant flowing from the condenser 11 enters the siphon pump 60 formed by the reversed bend in the down-leg 51 of the U-tube 12 and will accumulate in the depending loop thereof until the latter is completely filled. When the depending loop of the siphon pump 60 is completely filled the liquid refrigerant will siphon over and draw non-condensible gases from the condenser 11 into the down-leg 51 of the U-tube and siphon pump. Thus, the siphon pump 60 operates intermittently to deliver alternate slugs of liquid refrigerant and pockets of non-condensible gases from the condenser 11 to the storage vessel 50. The non-condensible gases and liquid refrigerant enter the bottom of the storage vessel 50 and the gases being lighter than the liquid they will bubble through the liquid to the top of the vessel. As the non-condensible gases accumulate in the top of the storage vessel 50 they will displace the liquid refrigerant therein and cause it to flow through the up-leg 52 of the U-tube 12 to the evaporator 10. The increased amount of liquid refrigerant in the evaporator 10 will promote evaporation and cause more refrigerant vapor to enter the absorber 16 to be absorbed by the absorption solution. If the increased amount of refrigerant in the evaporator 10 does not promote evaporation it will flow through the tubes of the evaporator 10 as a liquid and spill over into the absorber 16. In either case the liquid refrigerant will dilute the absorption solution in the absorber 16 when non-condensible gases occur in the system. The absorption solution when so diluted will act as a safety factor to prevent the crystallization of salt therefrom due to the presence of non-condensible gases that may be still occurring in the system.

The heated copper oxide plates 57 in the chamber 56 produce a thermosiphon action to cause a circulation of the non-condensible gases in the storage vessel 50. The heated gases in the chamber 56 will rise and flow through the conduit 55 to the neck 53 of the storage vessel 50 where they are cooled and fall by gravity. As the non-condensible gases flow through the conduit 55 and neck 53 of the storage vessel 50 they are displaced by gases flowing to the chamber 56 through the conduit 54. As the non-condensible gases flow through the chamber 56 hydrogen, forming the major portion of the gases, react with the copper oxide plates 57 therein to form metallic copper and water. As the non-condensible gases are removed by the plates 57 they are displaced by liquid refrigerant received from the condenser 11 through the down-leg 51 of the U-tube 12 so that the storage vessel 50 is operable automatically to control the concentration of the absorption solution relative to the amount of gas removed by the plates.

If non-condensible gases other than hydrogen occur in the system they will gradually accumulate in the storage vessel 50 until all of the liquid refrigerant therein has been displaced. The non-condensible gases then will accumulate in the absorber 16 and condenser 11 and increase the pressure in the system to such a value as to indicate that a purging operation is necessary. However, even with such an extreme condition salt will not crystallize from the absorption solution as the storage vessel 50 is of such size that the total charge of liquid refrigerant delivered therefrom will dilute the solution below its saturation point.

To purge the storage vessel 50, the vacuum pump 61 will be operated until a vacuum is produced in the exhaust pipe 62 below the pressure prevailing in the storage vessel 50. The manually operable valve 63 is then opened and the non-condensible gases in the vessel will flow through the exhaust pipe 62 and pump 61 to the atmosphere. After the storage vessel 50 is purged of all the non-condensible gases contained therein, the manually operable valve 63 will be closed. Liquid refrigerant flowing from the condenser 11 then will be diverted from circulation in the system and stored in the storage vessel 50 which will again increase the concentration of the absorption solution to cause the system to operate at maximum capacity.

It will now be observed from the foregoing specification that the present invention provides a method of and apparatus for varying the concentration of the absorption solution to prevent the crystallization of salt from solution upon the occurrence of non-condensible gases in the system without decreasing the capacity until the occurrence of such gases. It will also be observed that the method and apparatus of the present invention provides for continuously transferring non-condensible gases from the various parts of the system to a storage container to automatically control the concentration of the absorption solution. It will still further be observed that the present invention provides for absorbing the non-condensible gases in the storage container and replacing the absorbed gases with liquid refrigerant.

While the method and a preferred form of the apparatus are herein described and illustrated, it will be understood by those skilled in the art that various changes may be made in the steps of the method and in the construction and arrangement of the parts of the apparatus without departing from the spirit or scope of the invention. Therefore, without limiting myself in this respect, I claim:

1. The method of controlling the concentration of absorption solution in a closed absorption refrigeration system operating in a partial vacuum which comprises circulating refrigerant through the system, diverting liquid refrigerant from its path of flow through the system and storing it to produce a predetermined concentration of the absorption solution, and transferring the stored refrigerant to cause it to flow through the system when non-condensible gases occur therein.

2. The method of controlling the concentration of absorption solution in a closed absorption refrigeration system operating in a partial vacuum which comprises providing a storage vessel connected to the system, storing liquid refrigerant in the storage vessel to maintain a predetermined concentration of the absorption solution during normal operation, and transferring non-condensible gases from the system to the storage vessel to displace the liquid refrigerant therein whereby to cause more refrigerant to circulate in the system when non-condensible gases are present.

3. The method of controlling the concentration of a saline solution in a closed two-pressure absorption refrigeration system operating in a partial vacuum and having a storage vessel connected to the system which comprises storing liquid refrigerant in the storage vessel to produce a predetermined concentration of the saline absorption solution, transferring non-condensible gases from the low pressure side to the high pressure side of the system, and transferring the non-condensible gases from the high pressure side of the system to the storage vessel to displace the liquid refrigerant therein whereby to cause more refrigerant to circulate in the system when non-condensible gases are present.

4. The method of controlling the concentration of absorption solution in a closed absorption refrigeration system having a storage vessel connected to the system which comprises storing liquid refrigerant in the storage vessel to produce a predetermined concentration of the absorption solution, transferring non-condensible gases from the system to the storage vessel to displace liquid refrigerant therein to cause it to circulate in the system, removing the non-condensible gases in the storage vessel by chemical action, and replacing absorbed gases with liquid refrigerant whereby to vary the amount of refrigerant circulating in the system in accordance with the amount of non-condensible gases present in the system.

5. The method of controlling the concentration of saline solution in a closed absorption refrigeration system operating in a partial vacuum and having a storage vessel connected to the system which comprises storing liquid refrigerant in the storage vessel to produce a predetermined concentration of the saline absorption solution in the system, transferring non-condensible gases occurring in the system to the storage vessel to displace the liquid refrigerant and cause it to circulate in the system, reducing the volume of the non-condensible gases in the storage vessel as by absorption or removal therefrom and replacing the removed gases with liquid refrigerant whereby to vary the amount of refrigerant in the system in accordance with the amount of non-condensible gases present in the system.

6. In an absorption refrigeration system which operates in a partial vacuum, a generator, a condenser, an evaporator, an absorber, means connecting the elements to provide a closed circuit for the circulation of a refrigerant and absorbent, said means comprising a U-shaped conduit connecting the condenser and evaporator and so arranged as to maintain a liquid column therebetween, and a vessel connected to the bottom of said conduit between the condenser and evaporator to receive and store liquid refrigerant therein during operation of the system.

7. In an absorption refrigeration system which operates in a partial vacuum, a generator, a condenser, an evaporator, an absorber, means connecting the elements to provide a closed circuit for the circulation of a refrigerant and absorbent, a vessel in the connecting means between the condenser and evaporator to receive and store liquid refrigerant therein, and a siphon pump in said connecting means for transferring non-condensible gases from the condenser to the vessel, said gases displacing liquid refrigerant in the storage vessel whereby to transfer the liquid refrigerant to the system when non-condensible gases are present therein.

8. In an absorption refrigeration system which operates in a partial vacuum, a generator, a condenser, an evaporator, an absorber, means connecting the elements to provide a closed circuit for the circulation of a refrigerant and absorbent, a storage vessel connected to the system between the condenser and evaporator to receive and store liquid refrigerant therein, a siphon pump for transferring non-condensible gases from the condenser to the storage vessel, said gases displacing the liquid refrigerant in the storage vessel to cause the refrigerant to circulate in the system, and means for removing the non-condensible gases in the storage vessel by chemical action.

9. In an absorption refrigeration system which operates in a partial vacuum, a generator, a condenser, an evaporator, an absorber, means connecting the elements to provide a closed circuit for the circulation of a refrigerant and absorbent, a storage vessel connected to said system between the condenser and evaporator to receive and store liquid refrigerant therein, means for continuously transferring non-condensible gases from the absorber to the condenser, a siphon pump for transferring non-condensible gases from the condenser to the storage vessel, said non-condensible gases displacing the liquid refrigerant in the storage vessel to cause the refrigerant to circulate in the system, and means for removing the non-condensible gases in the storage vessel by chemical action.

10. In an absorption refrigeration system which operates in a partial vacuum, a generator, a condenser, an evaporator, an absorber, means connecting the elements to provide a closed circuit for the circulation of a refrigerant and absorbent, said means comprising conduits connecting the condenser and evaporator and so arranged as to maintain a liquid column therebetween, a storage vessel connected to said conduit means to receive and store liquid refrigerant therein, a siphon pump for transferring non-condensible gases from the condenser to the storage vessel, said non-condensible gases displacing the liquid refrigerant in the storage vessel to cause the refrigerant to circulate in the system, means connected to the storage vessel to provide an auxiliary circuit for the circulation of non-condensible gases in the storage vessel, said auxiliary circuit having copper oxide therein, and means for heating the copper oxide to cause circulation of the non-condensible gases by thermosiphon action and removal of hydrogen from the non-condensible gases by chemical action.

11. In an absorption refrigeration system which operates in a partial vacuum, a generator, a condenser, an evaporator, an absorber, means connecting the elements to provide a closed circuit for the circulation of a refrigerant and absorbent, a storage vessel connected to said system between the condenser and evaporator, a fall tube pump connected to said absorber for continuously transferring non-condensible gases from the absorber to the condenser, a siphon pump in the connecting means for continuously transferring non-condensible gases from the condenser to the storage vessel, said non-condensible gases displacing liquid refrigerant in the storage vessel to cause the liquid refrigerant to circulate in the system, means for removing non-condensible gases in the storage vessel by chemical action, and a vacuum pump connected to said storage vessel.

12. In an absorption refrigeration system which operates in a partial vacuum and utilizes water as a refrigerant and a saline solution as an absorbent, a generator, a condenser, an evaporator, an absorber, means connecting the elements to provide a closed circuit for the circulation of refrigerant and absorbent, said means comprising a conduit connecting the condenser and evaporator and so arranged as to maintain a liquid column therebetween, a vessel connected to said conduit to receive and store liquid refrigerant therein, and means operable upon the occurrence of a condition in the system tending to cause crystallization of the saline solution for transferring liquid refrigerant from the storage vessel to the solution in the circuit.

13. In an absorption refrigeration system which operates in a partial vacuum and utilizes water as a refrigerant and a saline solution as an absorbent, a generator, a condenser, an evaporator, an absorber, means connecting the elements to provide a closed circuit for the circulation of the refrigerant and absorbent, a storage vessel connected to said circuit between the condenser and evaporator to receive and store liquid refrigerant therein, means for continuously transferring non-condensible gases from the absorber to the condenser, a siphon pump for continuously transferring non-condensible gases from the condenser to the storage vessel, said non-condensible gases displacing the liquid refrigerant from the storage vessel to cause the refrigerant to circulate in the system, a chamber connected to the storage container and providing a circuit for the circulation of non-condensible gases in the storage container, copper oxide plates in the chamber, means for heating the copper oxide plates to cause circulation of the non-condensible gases in the storage container through the circuit by thermosiphon action and removal of hydrogen from the non-condensible gases by chemical action, and a vacuum pump connected to the container.

14. In a two-pressure absorption refrigeration system of the vacuum type having a high pressure side including a generator and condenser and a low pressure side including an evaporator and absorber, conduits interconnecting the elements to provide closed circuits for the circulation of refrigerant and absorbent, said interconnecting conduits being so constructed and arranged as to maintain the pressure differential between the condenser and the evaporator and between the absorber and generator, means in the conduit between the condenser and the evaporator for withdrawing non-condensible gases from the condenser with the refrigerant, a vessel connected to said conduit between the condenser and evaporator for receiving and storing the non-condensible gases at the pressure in the condenser, and means for removing the gases from the storage vessel.

15. In an absorption refrigeration system which operates in a partial vacuum, a generator, a condenser, an evaporator, an absorber, means connecting the elements to provide a closed circuit for the circulation of refrigerant and absorbent, a storage vessel connected to the system to receive and store liquid refrigerant therein, and means for transferring non-condensible gases from the system to the storage vessel to displace the liquid refrigerant therein and cause it to circulate in the system.

PHILIP P. ANDERSON, Jr.

REFERENCES CITED

The following references are of record in the file of this patent:

UNITED STATES PATENTS

| Number | Name | Date |
|---|---|---|
| 1,882,253 | Randel | Oct. 11, 1932 |
| 1,897,223 | Altenkirch | Feb. 14, 1933 |
| 2,184,726 | Ullstrand | Dec. 26, 1939 |
| 2,221,971 | Haywood | Nov. 19, 1940 |